Patented Oct. 11, 1927.

1,645,226

UNITED STATES PATENT OFFICE.

CARNIE B. CARTER, OF PITTSBURGH, PENNSYLVANIA, ASSIGNOR TO S. KARPEN & BROS., OF CHICAGO, ILLINOIS, A CORPORATION OF WEST VIRGINIA.

PRODUCTION OF PHENOL-METHYLENE RESINS AND ALCOHOL FROM METHYLALS.

No Drawing. Application filed August 26, 1925. Serial No. 52,685.

The present invention is in the nature of a process for producing phenolic condensation products and alcohol from phenols and methylals.

The primary object is to provide a simple and practical method of producing phenolic condensation products from the materials mentioned quickly, operating at atmospheric pressures. A further object is to produce alcohol by a reaction carried on in the manner indicated.

The methylals are dirivatives of formaldehyde and alcohols. They are formed conveniently by the condensation of an alcohol with formaldehyde, in the presence of an acid condensing agent. The condensation may be represented by the reaction between formaldehyde and methyl alcohol to produce dimethyl methylal:

$2CH_3OH + CH_2O = CH_3OCH_2OCH_3 + H_2O$

It is only necessary in order to effect the condensation to mix 1.5 parts of methyl alcohol, containing 1% to 2% hydrochloric acid, with 1 part of commercial formalin and 1 part of fused calcium chloride and allow the mixture to stand at ordinary temperatures for several hours. Methylal is then recovered from the resulting mixture by fractional distillation. Yields amounting to 75% to 80% of the theoretical value may be obtained in this way.

A large number of methylals may be prepared from formaldehyde and the various alcohols. If the methyl alcohol used in the preparation above is substituted by ethyl, propyl, butyl, etc., alcohols we obtain the following series of methylals:

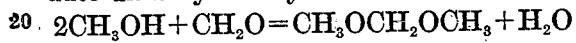

| | Boiling point (°C.) |
|---|---|
| Dimethyl methylal $(CH_3O)_2CH_2$ | 42 |
| Diethyl methylal $(C_2H_5O)_2CH_2$ | 89 |
| Dipropyl methylal $(C_3H_7O)_2CH_2$ | 137 |
| Dibutyl methylal $(C_4H_9O)_2CH_2$ | 164 |

The methylals are liquids which are quite stable in the presence of alkalies, but which are more or less easily hydrolyzed in the presence of acids to formaldehyde and the corresponding alcohols.

The methylals condense with phenol or cresols in the presence of water and an acid condensing agent to form phenolic resins. Alcohol, also, is formed in the reaction. The resins are fusible, hard, brittle products soluble in aqueous alkalies, alcohol, ether, acetone, etc., if the phenol and the methylal are condensed in the proper proportions to produce resins of this character. Acids which may be employed advantageously in the present process are the mineral acids, such as sulphuric, hydrochloric and phosphoric acids. Of these, sulphuric acid is preferred, particularly where the condensation product is to be employed in a molding compound. In such case, after washing the fusible, soluble resin, any remaining traces of acid may be readily neutralized by use of lime, for example.

In accordance with the present invention, the acid is employed in rather high proportion, preferably constituting about 20% of the reacting mixture, and the condensation is effected at atmospheric pressure.

An example of a suitable reacting mixture for the process is as follows:

| | Grams. |
|---|---|
| Methylal | 4.6 |
| Phenol | 8.5 |
| Water | 22.8 |
| Sulphuric acid | 9.1 |

Such a solution contains 20% acid, and the phenol and methylene groups are present in the proportion of nine phenolic groups to six methylene groups. By boiling this solution under a reflux condenser at atmospheric pressure, reaction will be completed in the course of a few minutes. The reaction products will comprise a fusible, soluble phenolic resin, methyl alcohol equivalent to the two mols of alcohol required to form methylal from formaldehyde, and also water and the acid. The reaction is exothermic in character; and when large batches are employed, the heat involved by the reacton, after the mixture has been brought to boiling is sufficient to cause the reaction to continue. The application of heat may be continued, however, as long as it may be found desirable.

In practice, resins may be produced from a phenol and a methylal by using a suitable vessel of acid-resisting material, such as glass, or metal enameled so as to be acidproof, equipped with a suitable form of condenser. Such a vessel is charged with the phenol, methylal, and preferably with about an equal quantity of aqueous acid, containing 20% more or less of acid. The charge is heated at the boiling point for a sufficient time to cause the reaction to complete itself;

the reflux condenser then is cut out of the system, or by-passed, and the reaction products are subjected to distillation to remove alcohol and a part of the water. The aqueous alcoholic condensate recovered in the distillation is subjected to a second distillation in order to separate the alcohol from the water and to effect its recovery. The resin in the still is tapped off from the aqueous acid layer and is washed several times by agitation with hot water, or by kneading with cold water. The wash water from the first few washings is added to the recovered acid in order to conserve acid, and also to conserve such amounts of free phenol as may be present in the solution. The recovered acid is used again and again in the operation of the process.

The resin, after thorough washing to remove acid, may be heated to elevated temperatures to effect drying, and also, if desired, to remove some of the excess phenol. It then is in form for use, it being only necessary to add the required quantities of hardening agents, fillers, solvents, etc., in order to transform it into the infusible, insoluble resinous products known in the arts.

Any suitable phenolic body may be employed in lieu of phenol. For example, the cresols may be condensed with equal facility; and the dimethyl methylal may be supplanted by the various methylals derived from ethyl, propyl, butyl, etc., alcohols. The reaction is general for the methylals as a class of substances.

The methylals are quite stable in the presence of aqueous alkalies, so that alkalies or bases are not suitable to be used for condensing agents.

Usually it is desirable to employ a considerable excess of the phenolic body, say enough to give about 1½ phenolic groups to each methylene group. This produces a fusible and soluble resin, and, after some of the excess phenol, say 10% or more, is blown off, the resin still remains fusible and soluble, but at room temperature is hard and brittle.

The fusible and soluble resin may be employed in producing a final infusible and substantially insoluble phenolic condensation product in accordance with known methods. For example, hexamethylenetetramine, formaldehyde, or other suitable active methylene body, may be mixed with the fusible and soluble resin in sufficient proportion to give to the mass about one methylene group to each phenolic group. When such mass is subjected to the action of heat for a suitable length of time the mass is converted to the final infusible and substantially insoluble state.

Before conversion to the final state, suitable dyes or pigments and suitable filling materials may be mixed with the mass, if desired.

It may be stated that the reaction mixture may comprise additional materials. For example, instead of employing pure methylal in the process, one may employ a by-product solution obtained in the manufacture of formaldehyde. Such a solution may, for example, be as follows:

| | Per cent. |
|---|---|
| Methylal | 62.5 |
| Formaldehyde | 5.6 |
| Methyl alcohol | 23.9 |
| Water | 8.0 |
| | 100.0 |

As an example of the manner in which such a solution may be employed in the process by mixing with the solution suitable percentages of phenol and acid, the following is given as an instance of suitable reacting mixture:

| | Grams. |
|---|---|
| Methylal | 4.5 |
| Phenol | 10.7 |
| Methyl alcohol | 1.7 |
| Formaldehyde | 0.4 |
| Water | 15.6 |
| Sulphuric acid | 11.1 |
| | 44.0 |

The acid content of the mixture just given is 25.2% by weight; and the ratio of phenol to methylene groups is nine mols of phenol to six mols of methylene. This mixture was brought to boiling in a flask under a reflux condenser. Reaction took place rapidly, as could be noted from the rate at which refluxing subsided, and also by the necessity for increasing the heat in order to maintain boiling. The reaction seemed to be complete in the course of a few minutes, but heating was continued for two hours in order to ensure complete reaction. After two hours, 25 cc. of water was added to the flask, and the reaction liquor showing the resinous layer at the bottom of the flask, was subjected to distillation in order to remove the alcohol. The resin, almost devoid of color, could be kneaded in ice water, or agitated with hot water to effect washing. The resin, freed from acid, was heated one hour at 150° C. to 160° C. It was quite fluid at the elevated temperature, but set on cooling to room temperature to a transparent, slightly greenish solid, possessing the properties of a nine-six resin prepared from phenol and hexamethylenetetramine. That is, such a resin contains about 1½ phenol groups to each methylene group.

It has been demonstrated by numerous experiments that the proportions of the materials present in the reacting mixture may be varied within rather wide limits. It is desirable, however, to use a sufficiently large proportion of the phenolic body employed to yield a distinctly fusible, soluble resin. This ensures the production of a good product and obviates danger of failure. The fusible, soluble product can be readily washed, or purified; and any remaining traces of acid may be neutralized. This is easily effected, in the case of the use of sulphuric acid, by introducing a little lime. Again, the amount of aqueous acid present in the reacting mixture may vary greatly, so long as a suitable strength is preserved. In the case of sulphuric acid, it is preferred to have the acid present to the extent of about 20% of the reacting mixture. A practicable range for sulphuric acid is from about 10% to about 30% of the reacting mixture.

Hydrochloric acid will effect very rapid reaction, but its use is not so desirable where the resin is to be employed in a molding compound. Phosphoric acid may be used as an equivalent, but a higher percentage is necessary in order to obtain the same expedition in carrying on the reaction. Organic acids are not sufficiently powerful to indicate the desirability of their use as a catalyst in the present process.

The foregoing detailed description has been given for clearness of understanding only, and no unnecessary limitations should be understood therefrom, but the appended claims should be construed as broadly as permissible in view of the prior art.

What I regard as new, and desire to secure by Letters Patent, is:

1. The method of producing a phenolic condensation product which comprises boiling at substantially atmospheric pressure a phenolic body, a solution of methylene body consisting principally of methylal and mineral acid, the mineral acid being present in excess of ten per cent of the reacting mixture; and recovering and purifying the phenolic condensation product produced by the reaction.

2. The method of producing a phenolic condensation product which comprises boiling under a reflux condenser a phenolic body, a solution of active methylene body consisting principally of methylal and a mineral acid, the phenolic body being taken in substantial excess of an equi-molecular proportion and the acid constituting at least ten per cent of the reacting mixture; continuing the operation until the reaction is substantially completed; boiling off and recovering the alcohol produced; and recovering and purifying the phenolic condensation product produced.

3. The process of producing a phenolic condensation product which comprises boiling under a reflux condenser a mixture comprising methylal, a phenolic body taken in substantial excess of an equi-molecular proportion so as to produce a fusible, soluble resin, and mineral acid in proportion constituting at least substantially ten per cent of the reacting mixture, such operation being continued until the reaction is substantially completed; and separating the phenolic condensation product from the reacting mixture.

4. The process of producing a phenolic condensation product which comprises: boiling under a reflux condenser a mixture comprising a phenolic body and methylal in the presence of water and mineral acid, the phenolic body being in such substantial excess of an equi-molecular proportion as to produce a fusible, soluble resin and the acid constituting at least substantially ten per cent of the reacting mixture, such operation being continued until the reaction is substantially complete; boiling off and recovering the alcohol; and separating and purifying the resin formed.

5. The process of producing a phenolic condensation product which comprises: boiling under a reflux condenser a phenolic body and an active methylene body consisting principally of methylal in the presence of water and a mineral acid constituting about twenty per cent of the reacting mixture, such operation being continued until the reaction is substantially complete; distilling water and alcohol from the reacting mixture and recovering the alcohol; separating the resin from the remaining liquid and washing it; and adding to the purified resin a sufficient quantity of an active methylene body to enable conversion to a final and fusible state to be effected.

6. The method of producing a phenolic condensation product which comprises boiling at substantially atmospheric pressure a mixture comprising the following materials in about the proportions stated, viz.:

| | Grams. |
|---|---|
| Methylal | 4.5 |
| Phenol | 10.7 |
| Methyl alcohol | 1.7 |
| Formaldehyde | 0.4 |
| Water | 15.6 |
| Sulphuric acid | 11.1 |

7. The method described in claim 6 characterized by the recovery and purifying of the condensation product produced by the reaction.

CARNIE B. CARTER.